United States Patent
Vaittinen et al.

(10) Patent No.: US 7,613,169 B2
(45) Date of Patent: Nov. 3, 2009

(54) ENHANCEMENT OF PACKET TRANSFER MODE WHEN CIRCUIT SWITCHED RESOURCES ARE REQUESTED

(75) Inventors: Rami Vaittinen, Littoinen (FI); Antti Kangas, Oulunsalo (FI)

(73) Assignee: Nokia Corporation, Espoo (FI)

( * ) Notice: Subject to any disclaimer, the term of this patent is extended or adjusted under 35 U.S.C. 154(b) by 1166 days.

(21) Appl. No.: 10/802,407

(22) Filed: Mar. 16, 2004

(65) Prior Publication Data

US 2005/0207396 A1    Sep. 22, 2005

(51) Int. Cl.
*H04L 12/66* (2006.01)
(52) U.S. Cl. .................. 370/352; 370/328; 370/349; 370/353; 370/902; 370/913; 455/127.4; 455/437
(58) Field of Classification Search .................. 370/902, 370/913, 328, 331, 332, 349, 353; 455/127.4, 455/422.1, 437
See application file for complete search history.

(56) References Cited

U.S. PATENT DOCUMENTS

| 6,714,781 | B2 * | 3/2004 | Pecen et al. ............... 455/426.1 |
| 2003/0199273 | A1 | 10/2003 | Pecen et al. |
| 2006/0227754 | A1 * | 10/2006 | Ko ............................ 370/338 |

FOREIGN PATENT DOCUMENTS

WO    WO 0110080 A3    2/2001
WO    WO 0176165 A1    10/2001

OTHER PUBLICATIONS

3GPP TS 44.060 v6.5.0 (Dec. 2003)"Radio Link Control/Medium Access Control (RLC/MAC) Protocol" (Release 6).
3GPP TS 45.008 v6.5.0 (Nov. 2003), "Radio Access Network; Radio Subsystem Link Control" (Release 6).
3GPP TS 44.018 v6.5.0 (Dec. 2003) "Mobile Radio Interface Layer 3 Specification; Radio Resource Control (RRC) Protocol" (Release 6).
3GPP TS 43.064 v6.1.0 (Aug. 2003) "Overall Discription of the GPRS Radio Interfact; Stage 2" (Release 6).
3GPP TS 23.060 v6.3.0 (Dec. 2003), "General Packet Radio Service (GPRS); Service Description; STage 2" (Release 6).

* cited by examiner

*Primary Examiner*—Curtis Kuntz
*Assistant Examiner*—Yosef K Laekemariam
(74) *Attorney, Agent, or Firm*—Ware, Fressola, Van Der Sluys & Adolphson LLP

(57) ABSTRACT

A mobile terminal and method are disclosed for use in a wireless communication system in order for the mobile terminal to be able to transition to a dual mode, in which a packet switched connection and circuit switched connection are used together, from a single mode in which packets are transferred. A packet associated control channel is used to convey a radio link control or multiple access control (RLC/MAC) message, and meanwhile packet switched resources are maintained. Then a dual transfer mode assignment message is received, as a result of using the packet associated channel to convey the radio link or multiple access control message.

30 Claims, 6 Drawing Sheets

ENHANCEMENT OF PACKET TRANSFER MODE WHEN CIRCUIT SWITCHED RESOURCES ARE REQUESTED

FIELD OF THE INVENTION

The present invention relates to wireless communication, and more particularly to packet switching and circuit switching for wirelessly communicating with a mobile terminal.

BACKGROUND OF THE INVENTION

The first Global System for Mobile (GSM) communication networks were designed for voice services rather than for data services. When the use of GSM data services started, it soon became evident that the Circuit Switched (CS) bearer services were not well-suited for certain types of applications with a bursty nature. Therefore the new Packet Switched (PS) data transmission service GPRS (General Packet Radio Service) was developed for packet services. GPRS is a packet radio network utilizing the GSM network, and GPRS endeavours to optimize data packet transmission by means of GPRS protocol layers on the air interface between a mobile station (hereinafter also called a mobile terminal) and a GPRS network.

A GPRS mobile station (MS) can operate in one of three modes of operation, as described in 3GPP TS 23.060, "Service description; Stage 2," Section 5.4.5. The three modes are Class-A Mode, Class-B Mode, and Class-C Mode. According to the Class-A mode of operation, the MS is attached to both GPRS as well as other GSM services, and therefore Class-A Mode corresponds to Dual Transfer Mode (DTM) Mode (hereinafter also called dual mode). The mobile user in Class-A Mode can make and/or receive calls on the two services simultaneously, for example having a normal GSM voice call and receiving GPRS data packets at the same time. According to the Class B mode of operation, the MS is attached to both GPRS and other GSM services, but the MS can only operate one set of services at a time. According to the Class C mode of operation, the MS can only be attached either to the GSM network or the GPRS network; the selection is done manually and there are no simultaneous operations.

Based on the current standard (3GPP TS 44.018, "Radio Resource Control Protocol"), when the MS is in packet transfer mode and a CS connection (also referred to as a radio resource or RR connection) is needed, then all packet resources must first be aborted, then an RR connection is established, and finally packet resources may be requested. This process occurs, for example, when the MS initiates a call. This prior art system is illustrated in FIG. 1 (also see 3GPP TS 43.064, "Overall description of the GPRS radio interface; Stage 2"), which shows RR operating modes and transitions between Class-A (DTM supported) and Class-B. A Temporary Block Flow (TBF) Release moves the MS from the Packet Transfer Mode 106 into an Idle/Packet Idle state 104, after which the MS must then establish a dedicated RR connection 108 in order to then access dual transfer mode 102 that includes both packet transfer capability and RR capability. In other words, after the release of the packet transfer connection 106, the MS is in the packet idle mode 104 and must perform a complete acquisition of system information and ask for PS resources all over again, in order to get into the Dual Mode 102 via the dedicated CS mode 108.

FIG. 2 further illustrates how the system is currently working, according to the prior art. The four vertical lines represent portions or stages of the network. The line 202 represents the mobile station (MS), the line 204 represents the base station system (BSS), the line 206 represents the serving GPRS support node (SGSN), and the line 208 represents the mobile switching center (MSC). Either the MS or network can request a CS connection. In either case, the packet session 210 is aborted and the establishment of the CS connection is initiated. In FIG. 2, a network pages the MS for a CS connection. The MS releases packet resources and transfers to the packet idle mode 214 in which mode the MS asks for CS resources as specified in 3GPP TS 44.018, "Radio Resource Control Protocol." When the MS has progressed to the dedicated mode 212, then the MS must request PS resources if PS resources are desired, by submitting a dual transfer mode (DTM) request as described in 3GPP TS 43.064, "Overall Description of the GPRS Radio Interface; Stage 2."

The main problem with these prior art techniques is that the MS is not allowed to immediately enter a combined CS mode 212 and PS mode 216 (which together comprise a dual mode) until the MS has performed various time-consuming steps. Thus, the mobile station will be forced to idle its packet switching capabilities, while it sets up the circuit switching session 212.

SUMMARY OF THE INVENTION

The present invention enhances the change from the packet transfer mode to the dual transfer mode by streamlining the transition and making it more direct. The solution is to employ a radio link control or multiple access control (RLC/MAC) message using a packet associated control channel (PACCH) in order to produce a dual transfer mode (DTM) assignment command, without any need to idle packet resources. The mobile station (MS) maintains packet switched (PS) resources during this process, and the MS thus gains better quality of service for a packet application. The RLC/MAC message uses the PACCH either to request the DTM assignment from the network, or alternatively to convey the DTM assignment from the network without any need for the request.

While in packet transfer mode, either the MS or a network may initiate the CS connection. In the latter case (i.e. the MS-terminated case), a network can provide CS resources immediately, using either a DTM ASSIGNMENT COMMAND or an IMMEDIATE ASSIGNMENT message. Since there is no need to send a PACKET PAGING REQUEST or a PACKET CS REQUEST message, the MS can get CS resources even faster when those messages are not included.

DETAILED DESCRIPTION OF THE INVENTION

Figure 3:
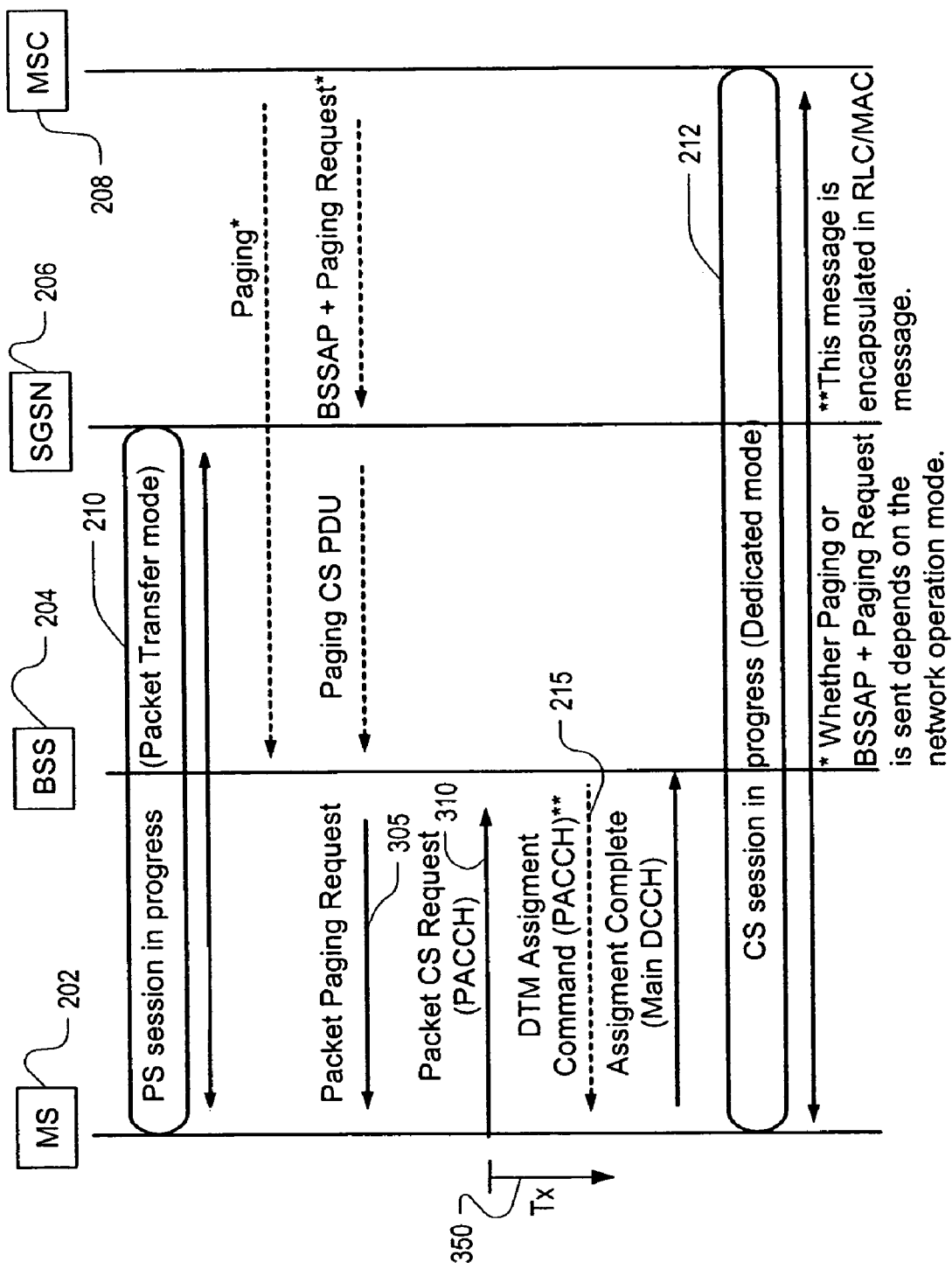
FIG. 3 details the transition to dual transfer mode from packet transfer mode according to the present invention, in an MS-terminated case, using a new RLC/MAC message in a Packet CS Request.

FIG. 3 illustrates an embodiment of the present invention in an MS-terminated case, as compared to an MS-originated case. However, FIG. 3 is plainly adaptable to an MS-originated case in which network paging is not used to initiate the transition to dual mode.

Figure 1:
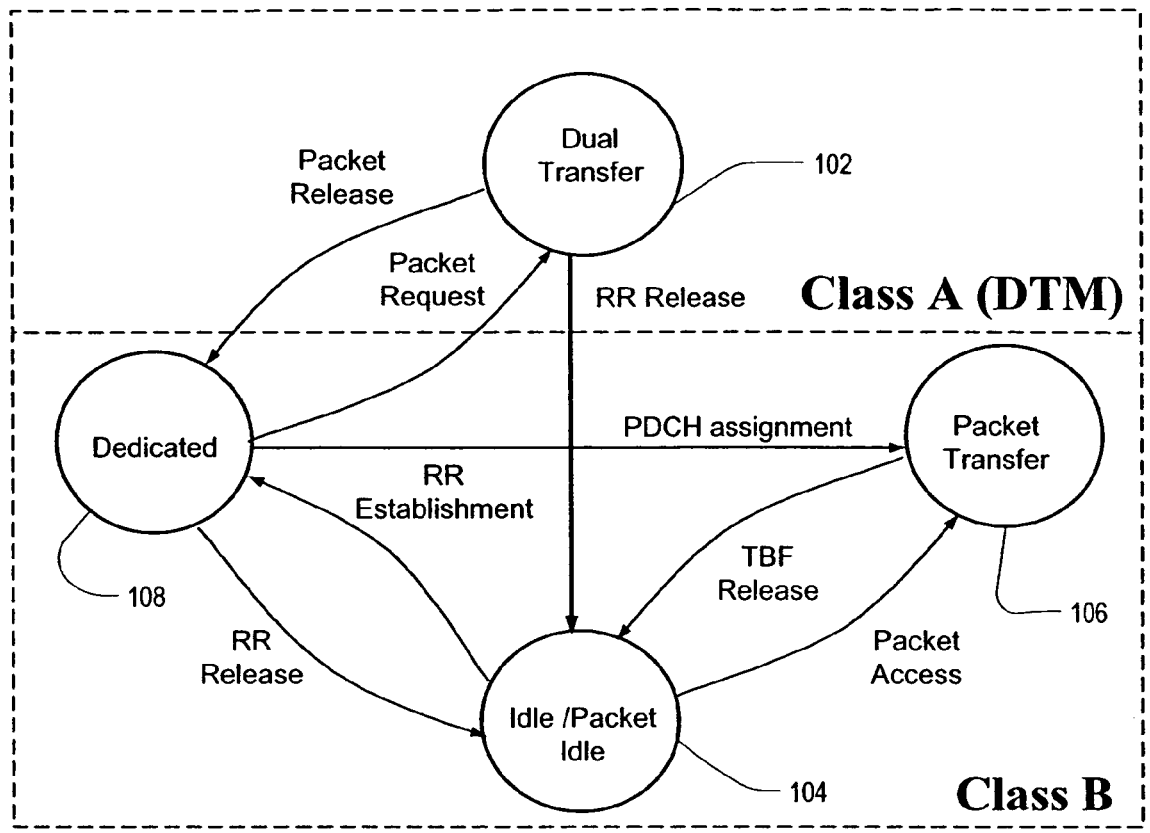
FIG. 1 shows how a mobile terminal transitions to dual transfer mode according to the prior art.
Figure 2:
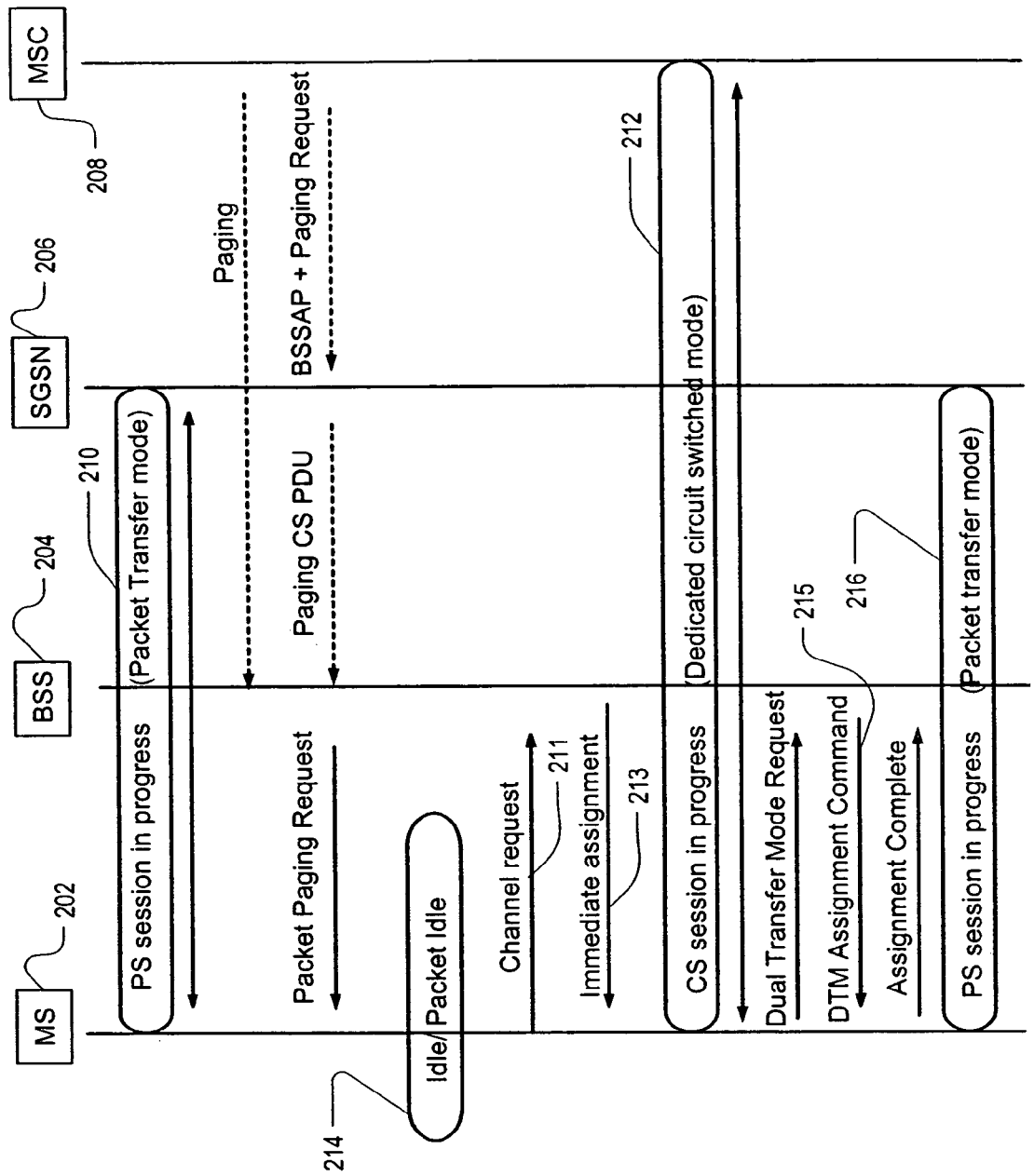
FIG. 2 details the transition to dual mode from packet mode according to the prior art.

An efficient way to establish the CS connection 212 in FIG. 3, and thereby access a dual transfer mode, is to use a new message instead of aborting and idling 214 the packet transfer mode as in FIG. 2. Accordingly, the MS will send a new RLC/MAC control message, for example as a PACKET CS REQUEST 310, on a packet associated control channel (PACCH) in order to originate the CS connection, or to answer a paging message from the network as shown in FIG. 3.

The MS makes a maximum of M+1 attempts to send this PACKET CS REQUEST message 310 on the PACCH. In addition to the maximum number of transmissions, the MS will also spread the transmission of this request message. The spreading factor is based on the BS_CV_MAX parameter. The spreading factor could be, for example, BS_CV_MAX+x radio blocks, where x is a further new parameter.

Having made M+1 attempts to send a PACKET CS REQUEST message 310, the MS starts a new RLC/MAC timer 350 (Tx). At expiration of the timer Tx, the dual mode access procedure is aborted, packet resources are released as in the prior art, and the mobile station initiates random access by sending the CHANNEL REQUEST message on the RACH as specified in 3GPP TS 44.018, "Radio Resource Control Protocol."

It is possible that the MS can use existing Max retrans and T3126 (currently used with the CHANNEL REQUEST message 211 when M+1 requests are sent) parameters, as specified in 3GPP TS 44.018, "Radio Resource Control Protocol," or alternatively new parameters can be specified.

In the MS-terminated case illustrated in FIG. 3, the new RLC/MAC control message sent via the PACKET CS REQUEST (PACCH) 310 can be structured as follows

```
< Packet CS Request > ::=
    {0 <GLOBAL_TFI : <Global TFI IE> >
    | 1 <TLLI : <TLLI IE> >}
    <CS_CHANNEL_REQUEST_DESCRIPTION:
    <CS Channel Request Description IE> >
    <padding bits>;
```

The "CS Channel Request Description IE" is specified in sub-clause 9.1.8 of 3GPP TS 44.018, "Radio Resource Control Protocol."

A network can reply to the MS by using existing radio resource management messages. These messages are encapsulated in one or more new RLC/MAC control messages. For example, a PACKET CS COMMAND can encapsulate all the RR messages. Another approach would be to add a new RLC/MAC message for each of the replies from the network.

A network will be able to allocate both PS and CS resources, or it will not be able to allocate PS resources, or it will not be able to allocate CS resources. Each of these three alternative situations will now be addressed. All three situations are possible in both the MS-originated or MS-terminated cases.

If a network can allocate both PS and CS resources, then it sends the DTM ASSIGNMENT COMMAND message 215. When the MS receives this message it starts CS connection establishment and finally enters the dual transfer mode. Note that the DTM ASSIGNMENT COMMAND message 215 is very large, especially the size of the conditional Frequency List parameter (the length is 4-132 octets), and it is possible that the size of this Frequency List parameter might somehow be limited.

If, however, a network cannot allocate PS resources, then it sends an IMMEDIATE ASSIGNMENT message 213. When the MS receives this message it releases the PS connection and starts establishment of a CS connection. In the CS dedicated mode, the MS may ask for PS resources by using the procedures of the prior art.

If, alternatively, a network cannot allocate CS resources, then it sends an IMMEDIATE ASSIGNMENT REJECT message. When the MS receives this message it continues in packet transfer mode normally.

Figure 4:
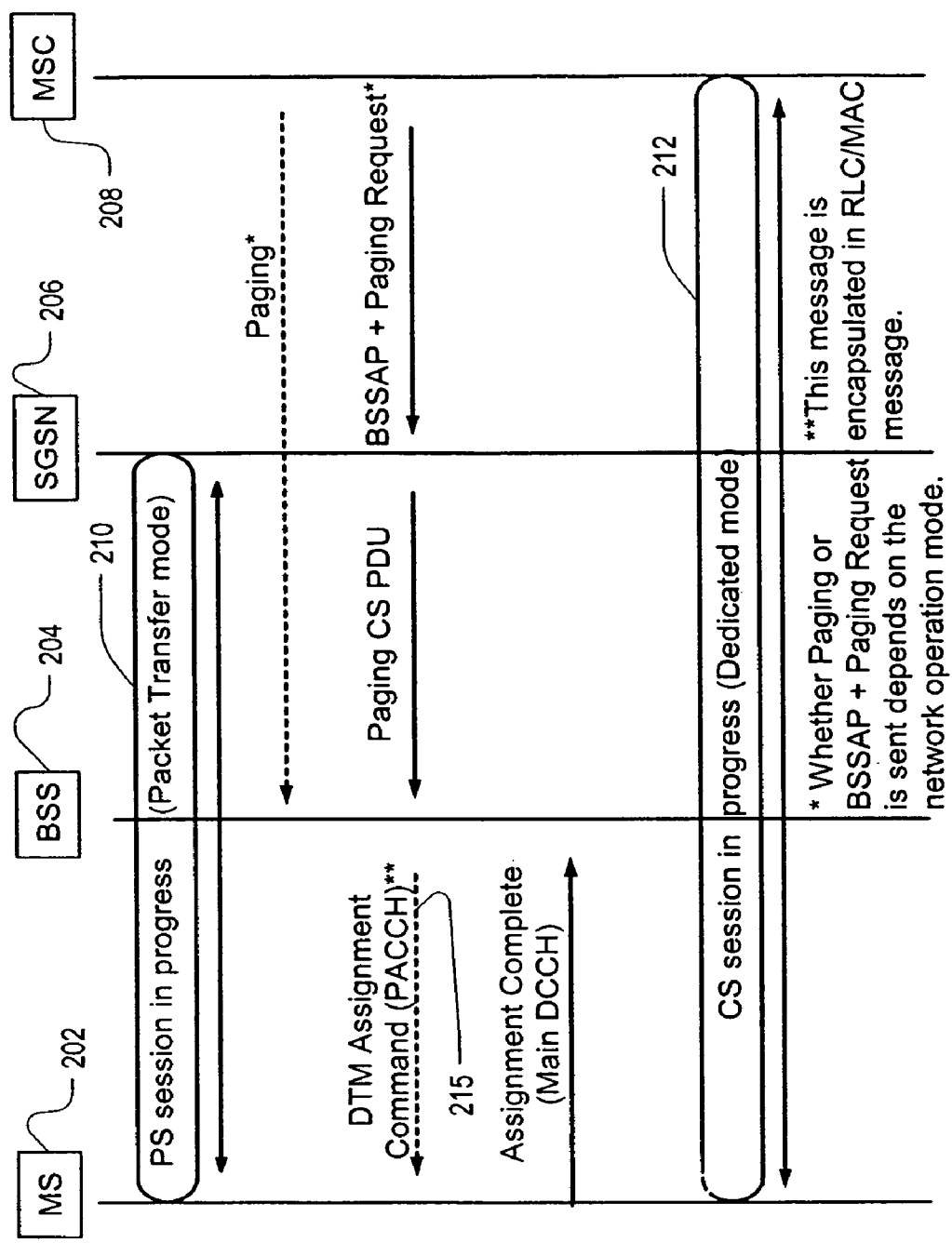
FIG. 4 details the transition to dual transfer mode from packet transfer mode according to the present invention, in another MS-terminated case.

As shown in FIG. 4, in order to further enhance the MS-terminated case, it is also proposed that a network directly sends the DTM ASSIGNMENT COMMAND message 215 instead of sending the PACKET PAGING REQUEST message 305 if the network can allocate both PS and CS resources (in this situation, the MS does not need to send the PACKET CS REQUEST message 310). In case CS and PS resources cannot both be allocated, it is possible to send an IMMEDIATE ASSIGNMENT 213.

In both the DTM ASSIGNMENT COMMAND 215 and also the IMMEDIATE ASSIGNMENT message 213, a new parameter is needed to indicate that the message is sent because of paging. In addition, an indication that the MS supports this feature is needed in the MS Radio Access Capability information element (IE).

There are at least two possibilities for the message transfer on PACCH. First, it is possible to use a single RLC/MAC message for encapsulating all the RR messages already described herein. This possible approach has the advantage that only one RLC/MAC message definition is needed, which makes the present invention simpler, and uses only one RLC/MAC message type code point. This first solution would be in line with the provision of SI message on PACCH, specified for the Network Assisted Cell Change procedure introduced in 3GPP Release 4. The message, according to this first possibility, could be called for example PACKET CS COMMAND. A second possibility is to use separate RLC/MAC messages. The merits of this second solution are not as great as those of the first solution. In either of these two possible embodiments, an indication that a network supports this RLC/MAC message feature is needed in the GPRS Cell Options information element (IE).

It is to be observed that, in both FIGS. 3 and 4, there is no need for various features of the prior art shown in FIG. 2, and especially no need for the Idle/Packet Idle 214. Thus, the present invention makes it possible to eliminate interruptions of the PS session 210.

Figure 5:
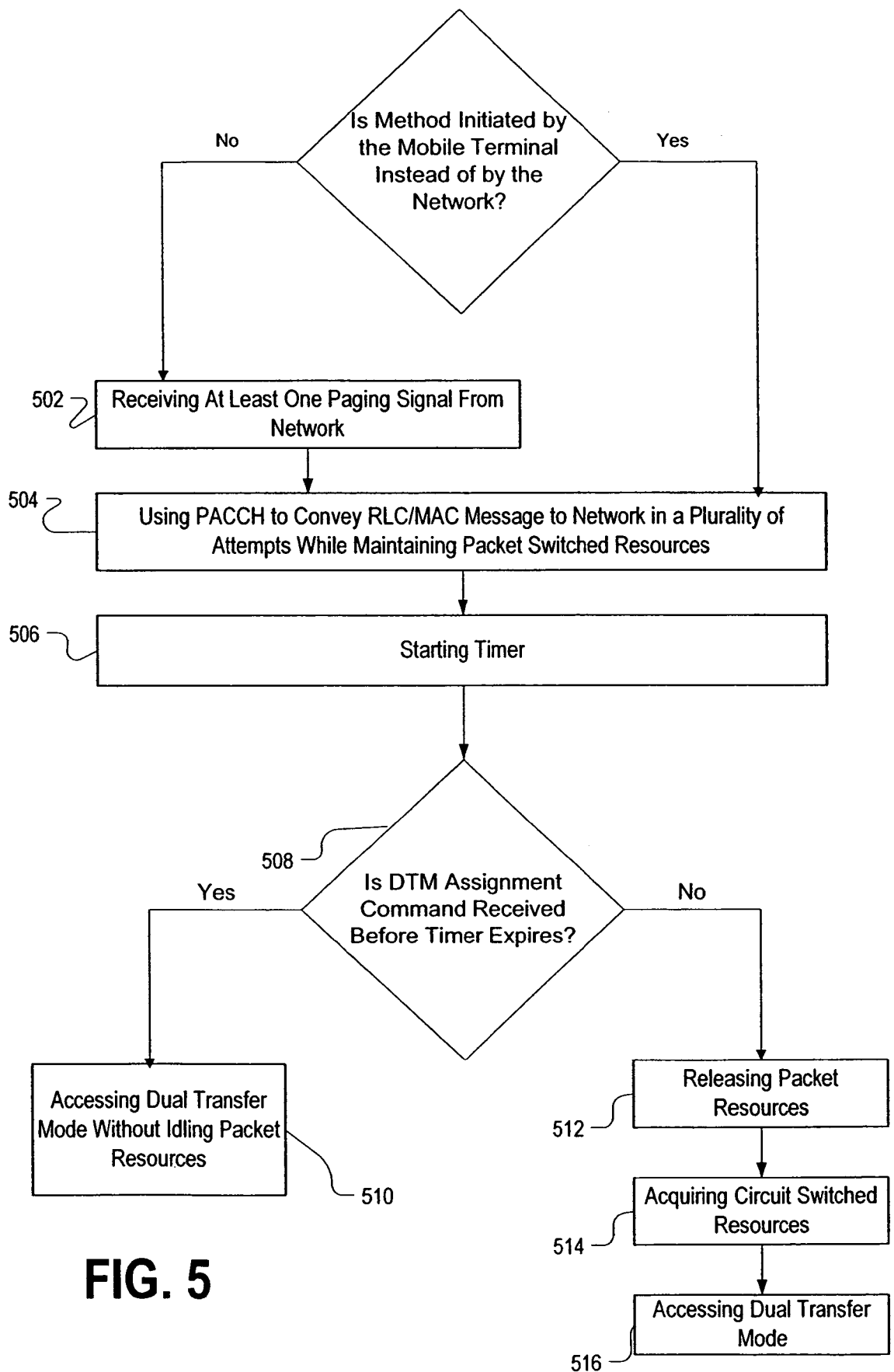
FIG. 5 is a flow chart of a method according to an embodiment of the present invention.

Referring now to the flowchart of FIG. 5, this illustrates a method according to a best mode embodiment of the present invention. This method is for a mobile terminal to transition to a dual transfer mode, in which a packet switched connection and circuit switched connection are used together, from a packet transfer mode in which packets are transferred. In the step 502, a paging signal is received at the mobile terminal, from the network. This step 502 is, of course, unnecessary if the transition is initiated by the mobile terminal instead of by the network. In any event, the next step 504 is to use the PACCH to convey the RLC/MAC message to the network. In this embodiment, a plurality of attempts are made to convey this message, and during this process packet switched resources are maintained, instead of aborted or idled as in the prior art. After the plurality of transmit attempts, a timer is started 506 at the mobile terminal. A dual transfer mode assignment message (e.g. a dual transfer mode assignment command) is either 508 received or not received by the expiration of the timer. If it is received, then dual transfer mode is accessed 510 without idling the packet resources. However, if the timer expires without receipt of the DTM assignment command, then the method of the prior art is returned to: packet resources are released 512, circuit switched resources are acquired 514, and the DTM is then accessed 516.

Figure 6:
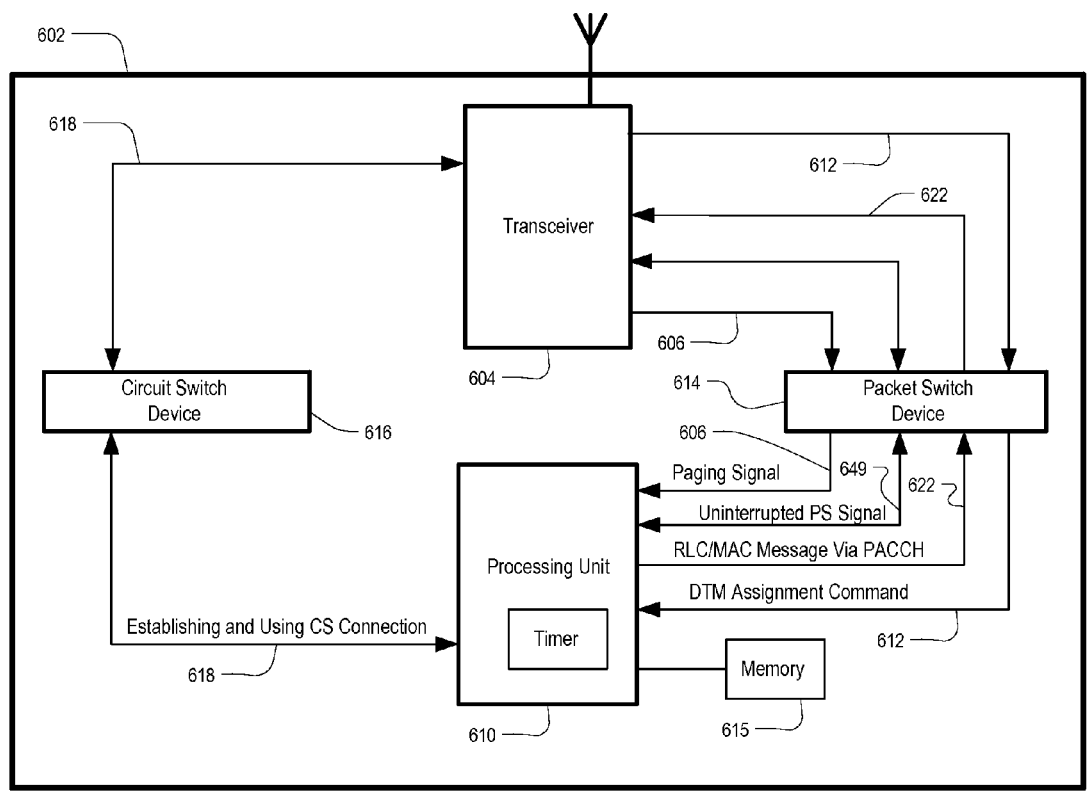
FIG. 6 is a block diagram of a mobile terminal according to the present invention.

FIG. 6, shows a mobile terminal 602 according to an embodiment of the present invention, for transitioning in a wireless communication system to a dual mode in which a packet switched connection and circuit switched connection are used together, from a single mode in which packets are transferred. This mobile terminal includes a transceiver 604, for sending toward a processing unit a paging signal 606 indicative that the network would like the mobile terminal to transition to dual mode. The mobile terminal 602 also includes a processing unit 610, responsive to the paging signal 606, for providing the RLC/MAC message 622 via PACCH. The mobile terminal also includes a memory 615, for example a computer readable medium or storage structure, operatively coupled to the processing unit 610 and encoded with a software data structure configured to cause the processing unit 610 to perform operations as shown in FIG. 5. All the while, packet switched (PS) resources 649 are uninterrupted. In response to the signal 622, the processing unit 610 receives a DTM assignment command 612 that allows the establishment and use of a circuit switched connection 618 in conjunction with the packet switched connection 649. The processing unit 610 includes a timer, so that if the DTM Assignment Command 612 is not received by the expiration of the timer, then the processing unit will revert to the prior art method of acquiring dual mode, which includes the release of PS resources.

It is to be understood that all of the present figures, and the accompanying narrative discussions of best mode embodiments, do not purport to be completely rigorous treatments of the method, terminal, and system under consideration. A person skilled in the art will understand that the steps and signals of the present application represent general cause-and-effect relationships that do not exclude intermediate interactions of various types, and will further understand that the various steps and structures described in this application can be implemented by a variety of different combinations of hardware and software, in various configurations and sequences, which need not be further elaborated herein.

What is claimed is:

1. A method in a wireless communication system for a mobile terminal to transition to a dual mode, in which a packet switched connection and circuit switched connection are used together, from a single mode in which packets are transferred, comprising:
   using a packet associated control channel to convey a radio link control or multiple access control message,
   maintaining packet switched resources, and
   receiving a dual transfer mode assignment message as a result of using the packet associated channel to convey the radio link control or multiple access control message.

2. The method of claim 1, wherein the radio link control or multiple access control message is from the mobile terminal to a network in order to request the circuit switched connection, and wherein the dual transfer mode assignment message is from the network to the mobile terminal in order to initiate establishment of the circuit switched connection and allocate resources.

3. The method of claim 1, wherein the dual transfer mode assignment message is conveyed by the radio link or multiple access control message from a network to the mobile terminal.

4. The method of claim 1, wherein the dual mode corresponds to a Class-A mode, and is preceded by a single mode corresponding to a Class-B or Class-C mode.

5. The method of claim 1, wherein the maintaining precludes idling packet resources.

6. The method of claim 2, wherein the radio link control or multiple access control message encapsulates at least one radio resource control message, or an additional radio link control or multiple access control message is introduced for each reply from the network.

7. The method of claim 6, wherein the radio link control or multiple access control message is a packet circuit switch command message.

8. The method of claim 6, wherein the radio link or multiple access control message is in response to paging by the network.

9. The method of claim 6, wherein the radio link or multiple access control message includes a packet circuit switch request.

10. The method of claim 6, wherein:
    the mobile terminal makes a plurality of attempts to send the radio link or multiple access control message,
    the mobile terminal starts a timer after the plurality of attempts, and
    if the timer expires then packet resources are released.

11. The method of claim 6, wherein if the network cannot allocate packet switched resources then packet resources are released.

12. The method of claim 6, wherein if the network cannot allocate circuit switched resources the mobile terminal continues in packet transfer mode only.

13. The method of claim 3, wherein the dual transfer mode assignment message or an immediate assignment message includes an indication of being sent instead of a packet paging request message.

14. A computer readable medium encoded with a software data structure sufficient to cause a processor to perform the method of claim 1.

15. An apparatus for transitioning in a wireless communication system to a dual mode wherein a packet switched connection and circuit switched connection are used together, from a single mode wherein packets are transferred, comprising:
    a transceiver configured to use a packet associated control channel that conveys a radio link control or multiple access control message; and
    a processing unit configured to receive a dual transfer mode assignment message via the transceiver as a result of the radio link or multiple access control message,
    wherein the apparatus is configured to maintain the packet switched connection while the radio link or multiple access control message is conveyed and the dual transfer mode assignment message is received.

16. The apparatus of claim 15, further comprising:
    a packet switch device configured to process and communicate an uninterrupted data signal between the processing unit and the transceiver; and
    a circuit switch device, configured to process and communicate a voice signal between the processing unit and the transceiver, the voice signal being initiated after the dual transfer mode assignment message is received,
    wherein the apparatus is comprised by a mobile terminal.

17. The apparatus of claim 15, wherein the radio link or multiple access control message is transmitted by the transceiver, in order to request the circuit switched connection.

18. The apparatus of claim 15, wherein the radio link or multiple access control message is configured to convey the dual transfer mode assignment message, in order to initiate establishment of the circuit switched connection and allocate resources.

19. The apparatus of claim 15, wherein the dual mode corresponds to a Class-A mode, and is preceded by a single mode corresponding to a Class-B or Class-C mode.

20. The apparatus of claim 15, wherein maintaining the packet switched connection precludes idling packet resources.

21. The apparatus of claim 17, wherein the radio link control or multiple access control message encapsulates at least one radio resource control message, or an additional radio link control or multiple access control message is introduced for each reply from the network.

22. The apparatus of claim 21, wherein the radio link control or multiple access control message is a packet circuit switched command message.

23. The apparatus of claim 21, wherein the radio link or multiple access control message is in response to paging received by the transceiver.

24. The apparatus of claim 21, wherein the radio link or multiple access control message includes a packet circuit switch request.

25. The apparatus of claim 21, wherein:
the mobile terminal is configured to make a plurality of attempts to send the radio link or multiple access control message,
the mobile terminal is configured to start a timer after the plurality of attempts, and
if the timer expires then packet resources are released by the mobile terminal.

26. The apparatus of claim 21, wherein the dual transfer mode assignment message is sent instead of a packet paging request.

27. An apparatus for transitioning in a wireless communication system to a dual mode wherein a packet switched connection and circuit switched connection are used together, from a single mode wherein packets are transferred comprising:

means for using a packet associated control channel that conveys a radio link control or multiple access control message; and
means for receiving a dual transfer mode assignment message via the means for using the packet associate channel as a result of the radio link or multiple access control message,
wherein the apparatus is also for maintaining packet switched connection while the radio link or multiple access control message is conveyed and the dual transfer mode assignment message is received.

28. The apparatus of claim 27, further comprising:
means for processing and communicating an uninterrupted data signal between the processing unit and the transceiver; and
means for processing and communicating a voice signal between the means for receiving the dual transfer mode assignment message and the means for using the packet associate channel, said voice signal being initiated after the dual transfer mode assignment message is received,
wherein said apparatus is comprised by a mobile terminal.

29. A computer readable medium encoded with a software data structure sufficient to cause a processor to perform a method comprising:
using a packet associated control channel to convey a radio link control or multiple access control message, while in a packet-transfer mode,
maintaining packet switched resources in the packet-transfer mode, and
receiving a dual transfer mode assignment message as a result of using the packet associated channel to convey the radio link control or multiple access control message,
wherein in the dual transfer mode a packet switched connection and circuit switched connection may be used together.

30. The computer readable medium of claim 29, wherein the radio link control or multiple access control message is from a mobile terminal to a network in order to request the circuit switched connection, and wherein the dual transfer mode assignment message is from the network to the mobile terminal in order to initiate establishment of the circuit switched connection and allocate resources.

* * * * *

UNITED STATES PATENT AND TRADEMARK OFFICE
CERTIFICATE OF CORRECTION

PATENT NO. : 7,613,169 B2  Page 1 of 1
APPLICATION NO. : 10/802407
DATED : November 3, 2009
INVENTOR(S) : Vaittinen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1580 days.

Signed and Sealed this

Nineteenth Day of October, 2010

David J. Kappos
*Director of the United States Patent and Trademark Office*